(12) United States Patent
Li et al.

(10) Patent No.: US 12,406,070 B2
(45) Date of Patent: *Sep. 2, 2025

(54) BLOCKCHAIN SECURITY SYSTEM

(71) Applicant: VISA INTERNATIONAL SERVICE ASSOCIATION, San Francisco, CA (US)

(72) Inventors: Yue Li, Foster City, CA (US); Theodore Harris, Foster City, CA (US); Tatiana Korolevskaya, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 448 days.

This patent is subject to a terminal disclaimer.

(21) Appl. No.: 17/945,836

(22) Filed: Sep. 15, 2022

(65) Prior Publication Data
US 2023/0004657 A1    Jan. 5, 2023

Related U.S. Application Data

(63) Continuation of application No. 16/532,075, filed on Aug. 5, 2019, now Pat. No. 11,481,499.

(51) Int. Cl.
*G06F 21/57* (2013.01)
*G06Q 40/06* (2012.01)
*G06N 20/00* (2019.01)

(52) U.S. Cl.
CPC ........... *G06F 21/577* (2013.01); *G06Q 40/06* (2013.01); *G06F 2221/034* (2013.01); *G06N 20/00* (2019.01)

(58) Field of Classification Search
CPC ... G06F 21/55; G06F 2221/034; G06Q 40/06; G06N 20/00
USPC .......................................................... 726/23
See application file for complete search history.

(56) References Cited

U.S. PATENT DOCUMENTS

| | | |
|---|---|---|
| 11,481,499 B2 | 10/2022 | Li |
| 11,748,807 B1 * | 9/2023 | Schwarz, Jr. ......... H04L 9/3297 705/7.34 |
| 2016/0292672 A1 | 10/2016 | Fay |
| 2019/0238525 A1 | 8/2019 | Padmanabhan |
| 2020/0134189 A1 | 4/2020 | Carter |
| 2020/0273101 A1 | 8/2020 | Cella |
| 2020/0372154 A1 | 11/2020 | Bacher |
| 2020/0382310 A1 | 12/2020 | Jayachandran |

(Continued)

OTHER PUBLICATIONS

Shahaab et al., 2019 IEEE, "Applicability and Appropriateness of Distributed Ledgers Consensus Protocols in Public and Private Sectors: A Systematic Review", pp. 43622-43636 (Year: 2019).*

(Continued)

*Primary Examiner* — Khalil Naghdali
(74) *Attorney, Agent, or Firm* — K&L Gates LLP

(57) ABSTRACT

A first node on the blockchain storage system node may include data from other blocks on the blockchain used for blockchain verification and an additional node which may include an analysis element. The analysis element may include computer executable code for receiving data added to the blockchain, determining a risk score for the data added to the blockchain based on past performance and in response to the risk score being over a threshold, alerting members of blockchain of the risk score.

17 Claims, 9 Drawing Sheets

(56) References Cited

U.S. PATENT DOCUMENTS

2020/0394470 A1 12/2020 Ganapavarapu
2021/0042421 A1 2/2021 Li
2021/0089647 A1 3/2021 Suwad

OTHER PUBLICATIONS

Office Action (Non-Final Rejection) dated Dec. 29, 2021 for U.S. Appl. No. 16/532,075 (pp. 1-29).
Office Action (Notice of Allowance and Fees Due (PTOL-85)) dated Jul. 25, 2022 for U.S. Appl. No. 16/532,075 (pp. 1-11).
Rouhani et al., 2019 IEEE Access, "Security, Performance, and Applications of Smart Contracts: A Systematic Survey", pp. 50759-50779 (Year: 2019).

* cited by examiner

BLOCKCHAIN SECURITY SYSTEM

CROSS-REFERENCE TO RELATED APPLICATION

This is a continuation application of U.S. patent application Ser. No. 16/532,075, filed on Aug. 4, 2019, the disclosure of which is incorporated by reference in its entirety herein.

BACKGROUND

Blockchain applications have become increasingly popular. Users see benefits in having multiple parties in the chain verify a transaction or event before it is added to the chain or on the underlying transactions that may be represented on the blockchain. However, current system have few if any checks on members that join the chain. An advantage of blockchain is that you do not know who is part of the chain which makes it harder to commander control of the blockchain. On the other hand, not know who is part of the chain can allow virtually anyone become part of the blockchain, including people who join with the goal of committing fraud or having users invest in risky transactions.

SUMMARY

A blockchain storage system is disclosed. A first node on the blockchain storage system node may include data from other blocks on the blockchain used for blockchain verification and an additional node which may include an analysis element. The analysis element may include computer executable code for receiving data added to the blockchain, determining a risk score for the data added to the blockchain based on past performance and in response to the risk score being over a threshold, alerting members of blockchain of the risk score.

SPECIFICATION

Figure 1:
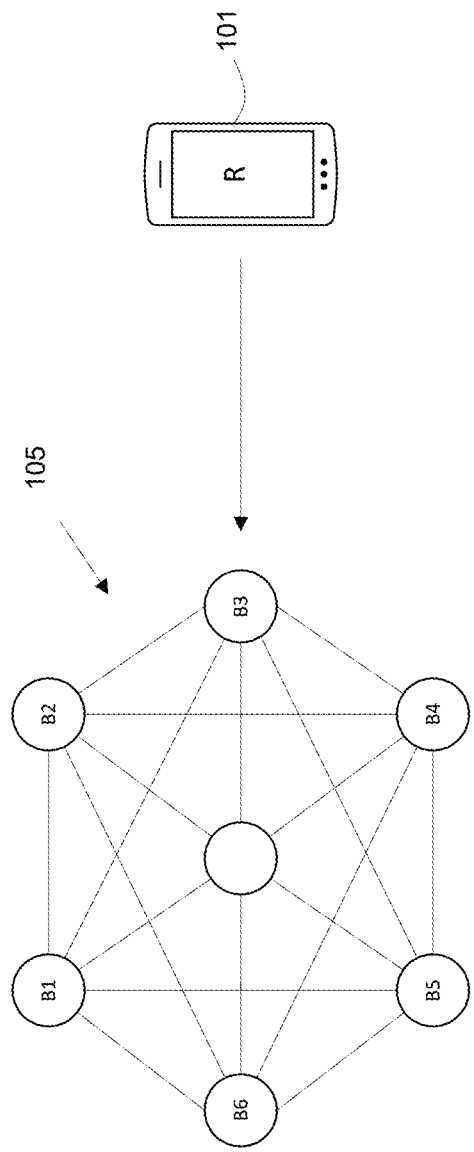
FIG. 1 is a sample blockchain.

As illustrated in FIG. 1, at a high level, when using a blockchain storage system (blockchain for short), a first person 101 may issue a request to the blockchain 105. The request may be a payment or may be to accept a contract. As will be explained, the requests are many and varied. The request may then be funneled into a peer to peer network and broadcast to each member or node (B1-B6).

Figure 2:
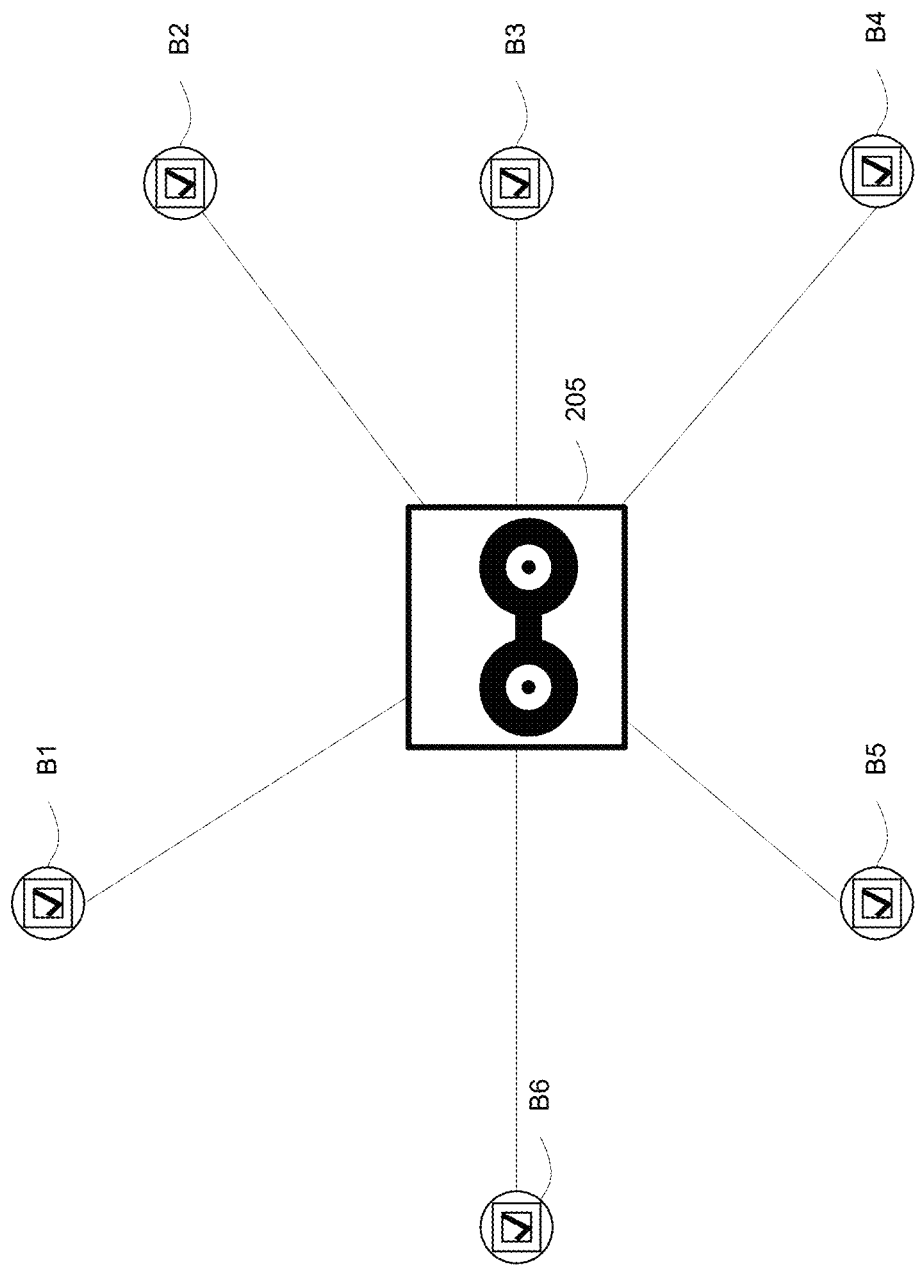
FIG. 2 is an illustration of a modified blockchain.

As illustrated in FIG. 2, individual nodes B1-B6 may receive the request and validate the transaction using an algorithm. The request may follow a known or proprietary protocol. The algorithm may take many forms and may vary in different situation as will be explained. The request may be approved and be turned into another block 205 to be added to the blockchain 105 and a blockchain ledger.

Figure 3:
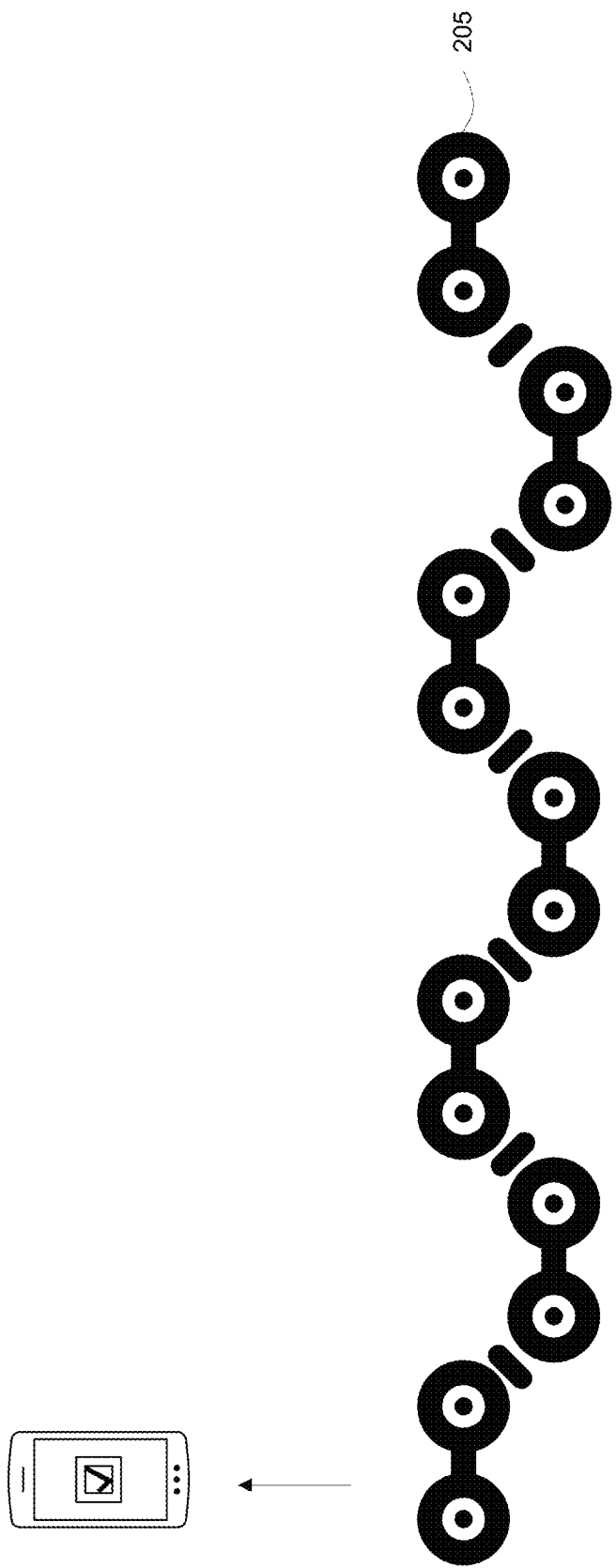
FIG. 3 is an illustration of a block being added to a blockchain.

As illustrated at FIG. 3, approved requests may be represented as blocks 205 and may be added to a public ledger. Once the block 205 is added to an existing chain, the transaction as a result of the request may be permanent and complete. Hashing reduces data to a bunch of seemingly random characters—for example, the hash of the phrase "the quick brown fox" may be "9ECB36561341D18EB65484E833EFEA61EDC74B84CF5E6AE1B81C63533E25FC8F" using an encoding method called SHA-256. Tweaking just one letter in the phrase produces a completely different hash, and it is not possible to go backward to figure out the original data from the hash. With blockchain, hashes may be linked together so any small or minute change is immediately visible, not just for the block housing it but for all other blocks added later.

An advantage to blockchain may be that a plurality of users are needed to validate a transaction. At the same time, there may be no authority or watchdog to oversee who is joining the blockchain. In a hypothetical, fraudulent users may join and overtake control of a blockchain and the value in the blockchain may be lost. Similarly. blockchains 105 may be used to store deals or proposed contracts. A party may have to accept a proposal and that acceptance along with details of the proposed contract may be stored on the blockchain. The proposal may have many risks such as the risk of the underlying contract, the risk of the players that are part of the transaction, the risk of the market in general, the skills of the players in the deal, etc.

A successful contract, for example, on a loan for a start-up, may be often influenced by all parties in the contract, not just the recipient of the loan. An active investor may make or break a new venture through micro-managing, giving access to influential contacts, having backup funds to smooth over rough times, etc. Also, the riskiness changes dramatically over time as new entrants enter and leave the target sector of the endeavor. One loan may require an active investor while another may not be based on factors such as if the endeavor needs external validation. Unfortunately, most risk estimations on loan are static and only take into consideration the recipient and not all contributing factors which may change over time and in face of outside factors.

What is needed is a dynamic, secure method of quantifying all those risk factors. The present system and method attempts to address the problem of not knowing the other users of the blockchain or the risks of a proposed transaction. By analyzing the data around the blockchain 105, a more sophisticated model may be created to help quantify the risk of the proposed action.

The proposed solution uses a machine learning (ML)/artificial intelligence (AI) scoring engine encoded securely in a blockchain. As the blockchain interacts with other blockchains and new data, the risk score may be provided for the proposal changes.

This may enable:

A unique, targeted risk score for each collection of participants, which may enable more specific risk estimates.

Better risk scoring when solutions rely on external events, and timing is critical (for example, a load to set up a flash store for a upcoming event).

An adaptive system, that may, as more information about riskiness is made available, influence prior models scores.

A safe and secure method to execute complex AI/ML algorithm within the blockchain context.

A method of allowing complex and secure blockchain interactions and mergers.

Figure 4:
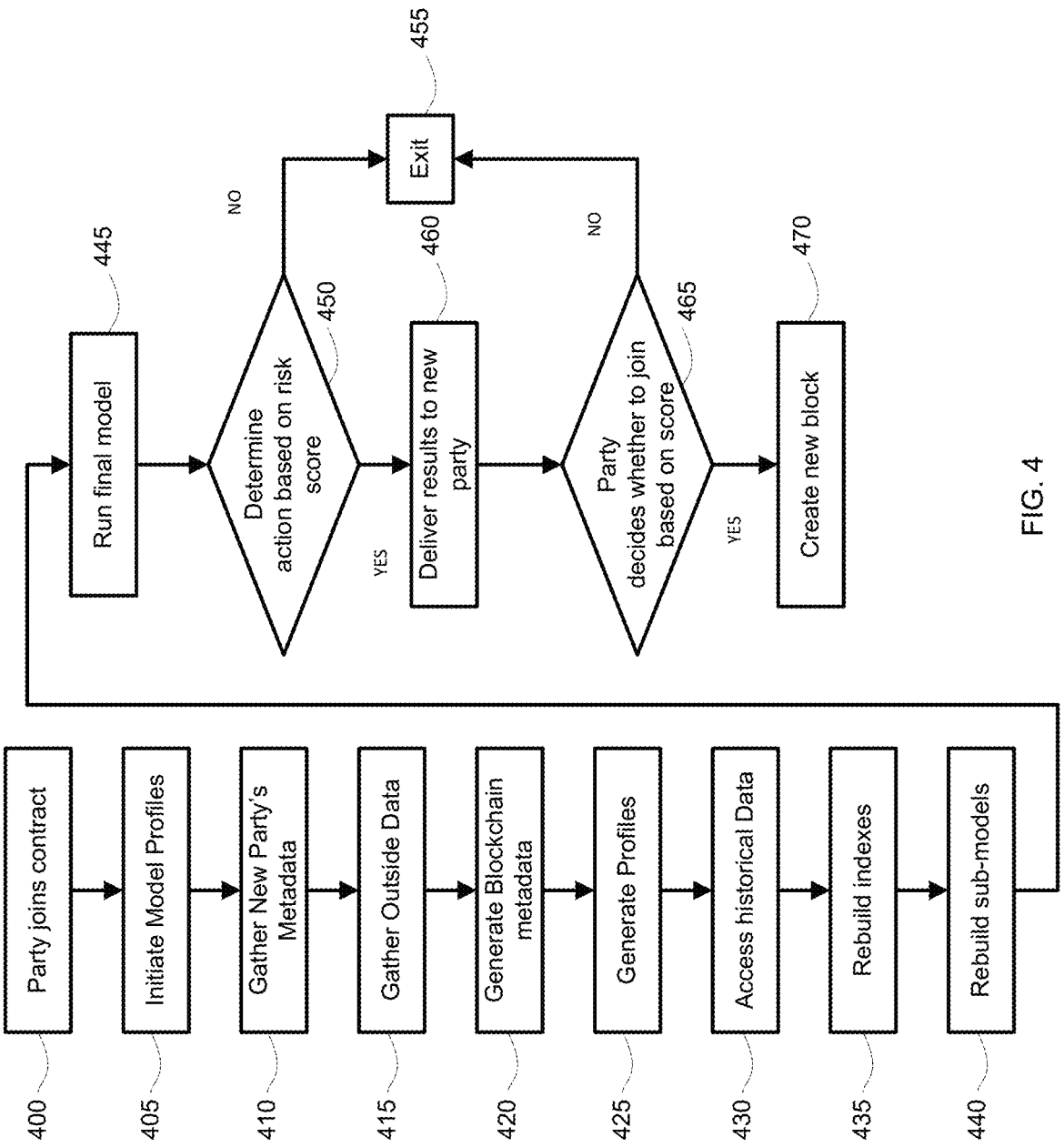
FIG. 4 is a flowchart of a method in accordance with the claims is an illustration of the analysis node on the blockchain.

A sample method may be illustrated in FIG. 4. When a new request is issued to the blockchain at block 400, the authority starts gathering data for a model design at block 405. Each blockchain may have its own model based on the request, such as a contract or an investment.

A target model template may be pulled from a database of model templates, segmented by types or requests, jurisdictions, user data and other attributes. For example, a loan requester originating from Europe, targeting participants across the world for a small business may have a designated template to build from. The request may be for a contract that may be accepted and stored on the blockchain. Similarly, a contract to use a web site may also have a template that is less complex but adaptable to many situations. For example, a database of possible end scenarios, one investor to N investors of various sizes may be built based on historical data of prior loans.

The template may have factors that may be used in building the model. These factors may be adjusted to what information is available for this particular request and what end scenarios are expected. Metadata may be used to establish the factors. At a high level, the metadata on new users may be used to establish a risk rating based on past transactions for this user or similar users. At block 410, metadata on the new party may be gathered. The possible user metadata may include:

User Metadata:
Count contracts;
Types of Contracts;
First seen;
Reputation Score;
Graph metrics;
Connective;
Ego Net size;
Influence score; and
Previous Activity.

These are just examples of possible metadata and not limitations. Logically, additional or less metadata may be available depending on each situation. The metadata may also change over time. For example, when new partners are joining, their data is used to generate a new score.

At block 415, outside data may be gathered. Outside data may relate to the type of transaction or to the players that are part of the transaction. In addition, outside sources of data may provide insight into the people trying to join the blockchain. For example, if a player has a criminal record for financial crimes, that data may be useful to people on the blockchain.

At block 420, blockchain metadata may be generated. Blockchain metadata may include data on past blockchains that may be similar to this blockchain. Sample metadata may include:

Creation data for the blockchain;
Start date of the blockchain;
Frequency of updates of the blockchain;
Average user reputation score on the blockchain; and
Previous Activity on the blockchain.

At block 425, profiles may be generated. The profiles may be for the members of the proposed request. For example, if the request is for a contract, there may be at least two parties to the contract, if not more. The profiles may be used to create a rating for the proposed request. Other members of the blockchain, if known, may also be profiled in some embodiments as may be other participants in the request such as follow investors.

At block 430, historical data may be accessed. The historical data may be many and varied. The history may be about the users, the blockchain and the proposed transaction. In addition, historical data on similar actions may also be analyzed and may be meaningful to assess the risk.

At block 435, indexes may be rebuilt. As the transaction and data related to the request may be updated, the indexes that represent the machine learning results may be rebuilt with the updated data. As the indexes are rebuilt, faster the model may operate as the index may be able to quickly locate relevant data.

At block 440, sub-model may be rebuilt. Logically, if there is new data, such as new members to a transaction or new market conditions, the model should take in to account the new data. Thus, the sub-model may be re-built to take into account the new data and related analysis.

Next, the model build process is started. Note: part of the model may be static and other may be custom built for this particular request. For example, if the blockchain is a standard contract to view a web site, a deep analysis of the players and the history of people using the web site may not be of much use. On the other hand, if the contract is to invest in a start-up, the details of the various players may be critical as a start-up may need guidance, personal connections and continued funding and a model more specific to the situation may be needed.

The base line score may be determined and a secure form of the final model may be included in the blockchain 105 for this contract. In this way, the score may follow the contract and if the contract is reviewed in the future, the initial score may be seen. For example, if a venture financing project is not successful, the financier may wish to review the initial paperwork to see if there were sufficient signs to signify the risk of the deal in view of the proposed return.

Using the new data, the blockchain 105, using an algorithm, delivers a customized score and saves it to the blockchain 105. The score may be on a scale and the scale may be set according to the user. For example, some users may want a number on a 100 point scale while other users may desire a simple letter grade and other users may desire a text categorical variable.

At block 445, a final model may be created. The final model may use all the data gathered and may create a final rating. As mentioned previously, the rating may take on a variety of forms such as numeric values or letter values.

The creation of the rating value may also take on a variety of forms. For some users, the potential return from an investment may be given a heavy weight and the model rating may reflect the upside of the request. In other examples, the potential risks may be the most important factor to a user and the risks may be the largest portion of the rating. In additional embodiments, a combination of user defined factors may create the rating.

Figure 5:
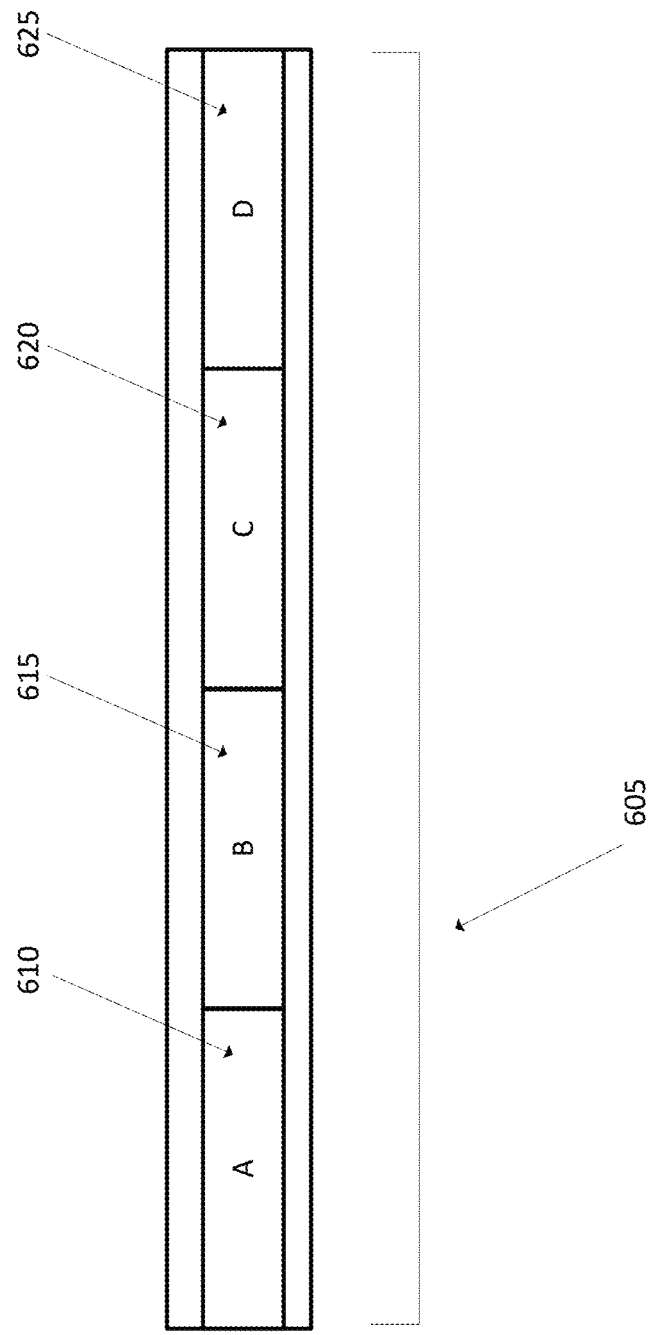
FIG. 5 is machine learning training set
Figure 6A:
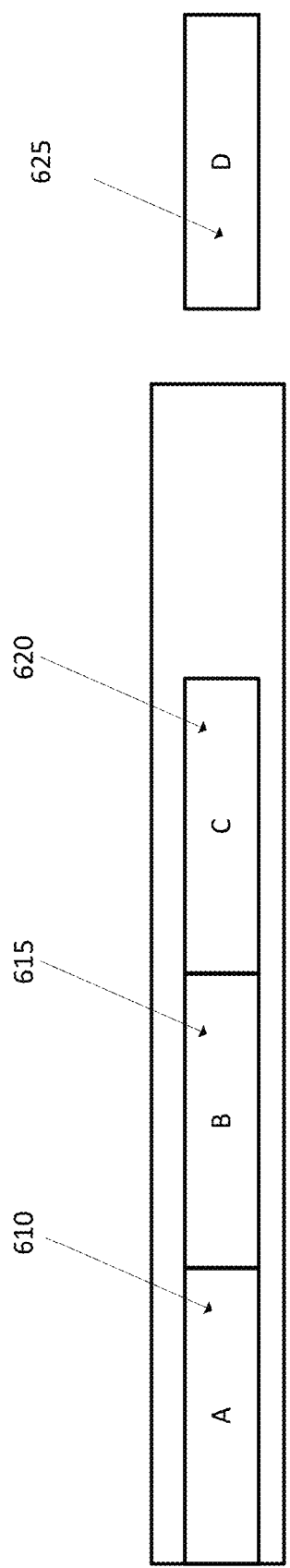
FIG. 6A illustrates a machine learning training set being rotated.
Figure 6B:
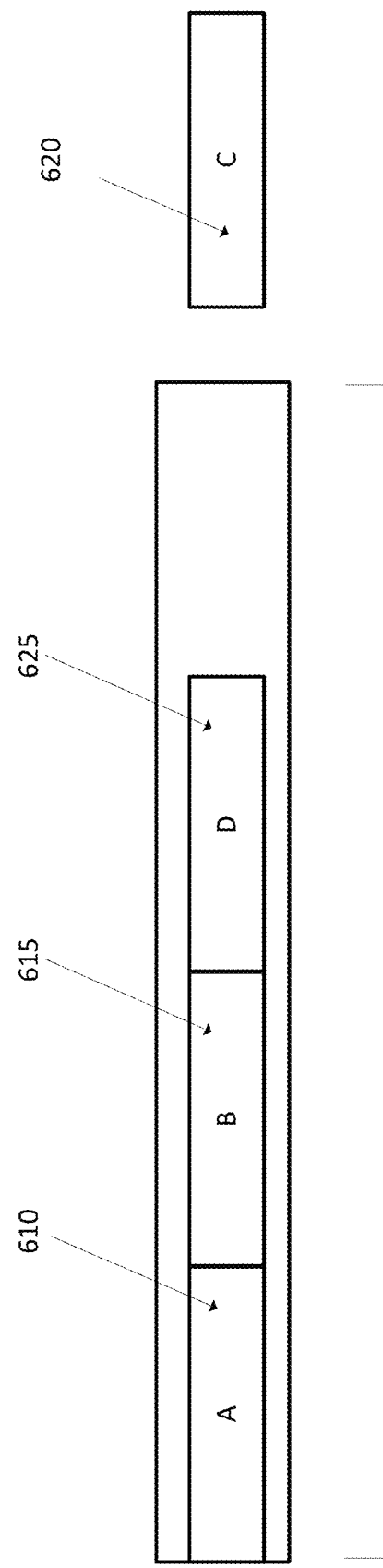
FIG. 6B illustrates a machine learning training set being rotated.

In some embodiments, the ratings may be refined over time. Machine learning may be used to analyze past ratings in view of the actual results. Machine learning may be used to review a training group of past risk rating data and determine risk ratings moving forward. FIG. 5 may illustrate sample artificial intelligence (AI) training data according to one or more embodiments. As an example and not a limitation, an artificial intelligence system may trained by analyzing a set of training data 605. The training data may be broken into sets, such as set A 610, set B 615, set C 620 and set D 625. As illustrated in FIG. 6A, one set may be using as a testing set (say set D 625) and the remaining sets may be used as training set (set A 610, set B 615 and set C 620). The artificial intelligence system may analyze the training set (set A 610, set B 615 and set C 620) and use the testing set (set D 625) to test the model create from the training data. Then the data sets may shift as illustrated in FIG. 6B, where the test data set may be added to the training data sets (say set A 610, set B 615 and set D 625) and one of the training data sets that have not been used to test before (say set C 620) may be used as the test data set. The analysis of the training data (set A 610, set B 615 and set D 625) may occur again with the new testing set (set C 620) being used to test the model and the model may be refined. The rotation of data sets may occur repeatedly until all the data sets have been used as the test data sets. The model then may be considered complete and the model may then be used on additional data sets.

At block 450, an action may be determined based on the risk score. In some cases, the risk score may be over a threshold and events may begin automatically. For example, if the risk score is over a threshold for a particular project, the project may be automatically rejected and the method may end at block 455. In other examples, the score may be below a threshold and the project may proceed to block 460.

At block 460, results may be delivered to the requestor that utilizes the blockchain. In this way, the requestor may determine if the transaction is acceptable. For example, as previously mentioned, some participants may have a different level of acceptable risk than other participants. Once the proposed request has been analyzed, the value may be above or below a thresholder of risk for each particular user.

Logically, the score is modified anytime a new partner joins in. A partner may be a contributor (employee) or an investor. The potential data may include:
Partner's reputation based on prior transactions.
Partner's ego net (who are they connected with) reputation.

This score may dynamically reflect the riskiness of the endeavor for the potential loan-issuing partner.

Potential partners can initially review the calculated new score based on their interaction to make a decision about joining. If they proceed with joining, the new score will be saved to a blockchain at block 470. If the score is unacceptable, the method may end at block 455.

As an example, the proposed investment may be for a new restaurant. Past restaurant investments may be analyzed using machine learning to determine factors that resulted in successful restaurant investments and which result in unsuccessful restaurant investments. Likely factors include the experience of the chef, the location, the type of food, the experience of the investors, the connections of the investors, etc. The current restaurant investment may be compared to past investments and a risk rating may be created. The risk rating may be stored in the blockchain. Investors may be presented the risk rating and the investors may then decide whether to invest or to withdraw from a project.

In another aspect of the system, additional blockchains can interact in various ways in the system:
Two blockchains: (project and contributor) can run a trail connection that estimate risk/reward of connecting the blockchains;
Two blockchains: (project and investor) can run a trail connection that estimate risk/reward of the investment;
Two blockchains can merge forming a new blockchain branch.

Figure 7:
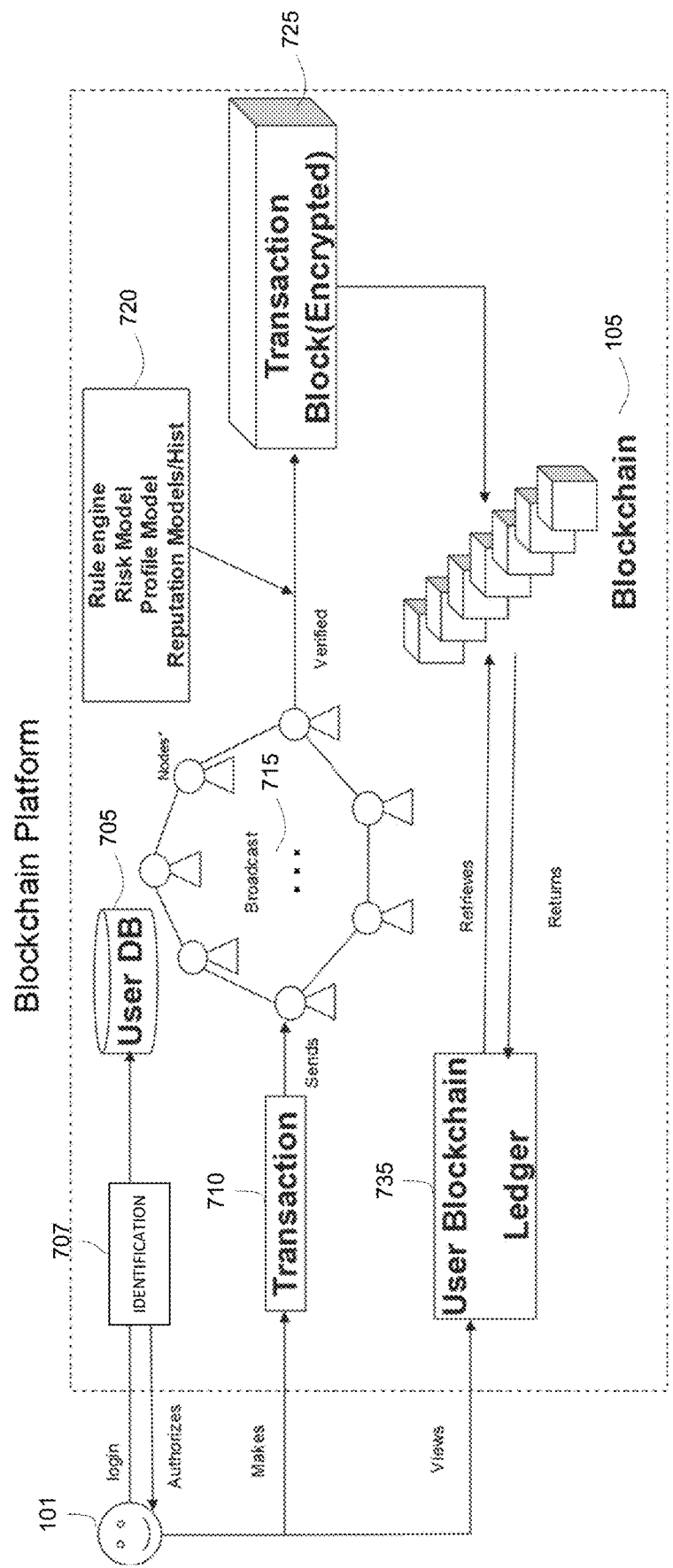
FIG. 7 of a blockchain platform.

FIG. 7 may illustrate a sample blockchain platform. A user 101 may login to the user database 705, which may entail submitting some identification 707 to be authorized using data from the user database 705. The identification 707 may take on many forms such as an ID and password to biometric identification to second channel confirmations to encrypted key exchanges.

The user 101 may then make a transaction 710 or other request of the blockchain. The request, in this case a transaction, may be communicated 715 to the nodes or members of the blockchain. One node may be a verification node 720 where the rules engine, risk model, profile model and reputation model/history may reside. Once the node has analyzed the request, the new transaction block 725 may be created and communicated to the blockchain 105. As the blockchain 105 operates, the request or transaction ledger 735 may be requested, the request/transaction may be added to the ledger and the ledger may be returned to the blockchain ledger 735. Users may then view the blockchain ledger 735.

Figure 8:
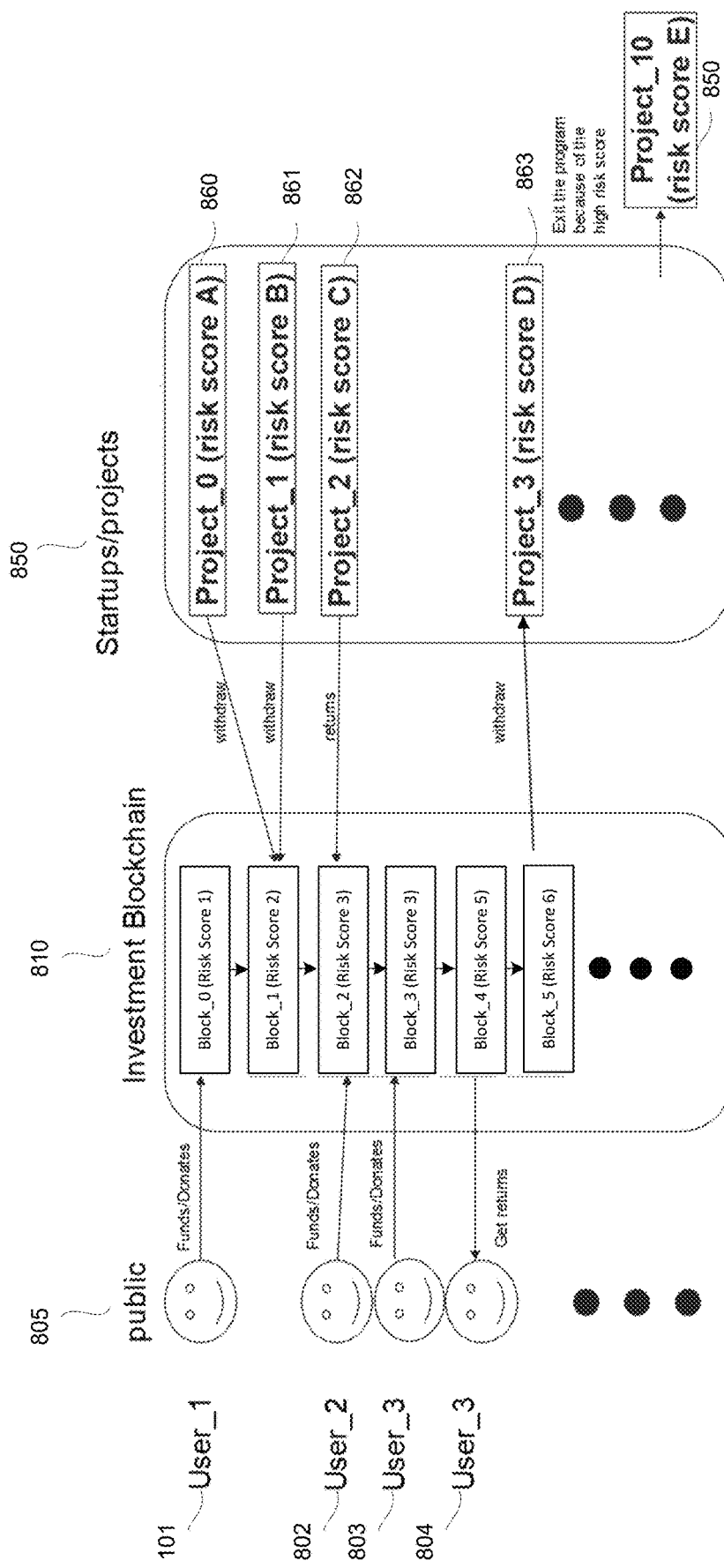
FIG. 8 is an illustration of a sample interaction with a blockchain.

FIG. 8 may illustrate some sample blocks on the blockchain. Blockchains may store data or metadata such as start date, frequency of updates, average user reputation score or previous activity. User 1 101 may be a public user 805 and may fund an investment blockchain 810 and there may be several public users 802, 803, 804. The funding may be stored at Block 0. The risk analysis function may execute and may store a risk score for the funding. Project 0 860 and Project 1 861 may withdraw funds from the investment blockchain and each project may have its own risk level. The risk levels of the projects may be analyzed by the risk analysis function and the updated risk score may be stored in block 1 on the blockchain 810. Project 2 862 with another risk score may return funds to the investment blockchain 810 which may be further analyzed by the risk analysis function. User 2 802 and User 3 803 may then add funds to the investment blockchain and the investment may be recorded in block 2 and 3 on the investment blockchain. User 3 804 may take returns from the blockchain investment and the withdrawal may be noted on the blockchain at block 4. Related, the risk score for the investment blockchain may be adjusted as the risk of the investment may have changed due to the withdrawal of money. Project 3 863 may then withdrawal more funds from the investment blockchain 810 which again may change the risk rating. The risk rating may then exceed a threshold for some users 805 and some users 805 may exit the investment blockchain which again may cause the risk score 850 to be updated. In response to the risk score 850 being over a threshold, members of blockchain may be alerted of the risk score 850. In addition, the risk score 850 may be communicated to parties looking to join the blockchain. In some embodiments, if the risk score 850 is over a threshold, the contract may be terminated from executing on the blockchain storage system.

Thus, a platform may be provided for managing and generating contractual blockchain with embedded, dynamic risk scores. The blockchain platform may handle multiple user roles. For example, an investment may have three different types of users such as investors, startups and participants. Whether a new role may be assigned may depend on the markets and local politics. For example in a crowd funding scenario:
User definition: investor may be anyone who registered, and seeking projects for investing/donating;
Startups (projects) may be registered, certified and provide enough information for making investment choices/decisions.

Participant Definition: Employees and resources to project.

An authority may support the backend, authentications, payments and risks.

Figure 9:
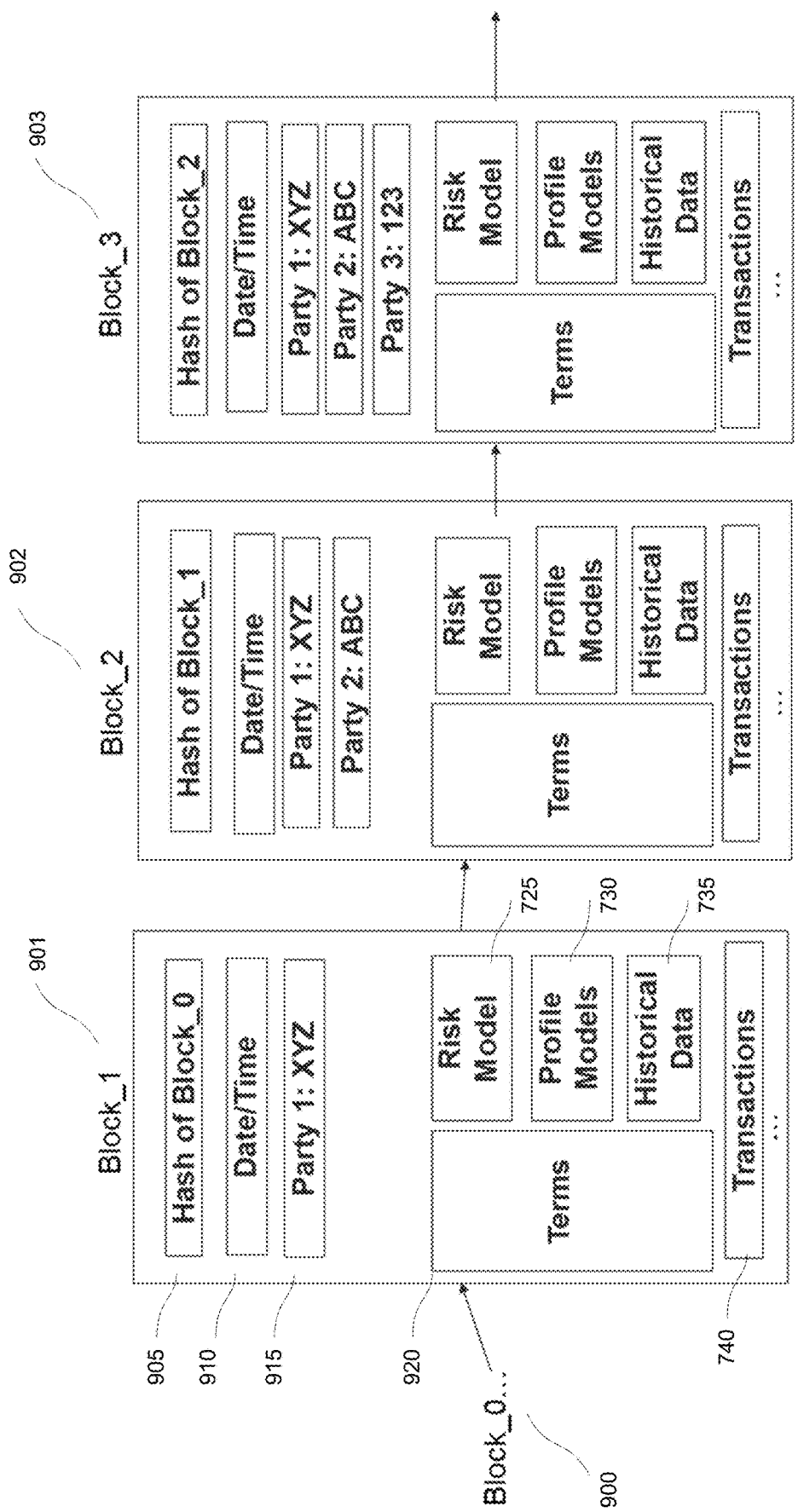
FIG. 9 is an illustration of the contents of sample blocks in the blockchain.

FIG. 9 may illustrate a sample block of the blockchain. A first node on the blockchain storage system node may include data from other blocks on the blockchain used for blockchain verification as is known in blockchain technology. Thus, block 1 901 may contain a hash 905 of block 0 (900) which may be a preceding block in the blockchain. An additional node may include data or metadata about the transaction being stored in the blockchain. The metadata may include a variety of data including ownership data. The data may also include a data about a contract based transaction executable on the blockchain storage system. Thus, block 1 901 may also contain the date/time 910 the block was last updated and the parties 915 to the transaction represented by the block 1 901.

Assuming the block is for a contract, the block 1 901 may also contain the terms 920 of the contract. The additional node may also include an analysis element. The analysis element may include computer executable code for receiving data added to the blockchain and for determining a risk score for the data added to the blockchain based on an analysis of the data representing the contract on the blockchain. As previously explained, the analysis may be based on several factors including past performance. Thus, the risk model 725 for the block, profile model for the transaction 730 and historical data 735 related to the transaction may be stored in the block 901. More specifically, the risk score for the data added to the blockchain may entail communicating data added to the blockchain to an analysis system outside the blockchain or the analysis system may be part of the blockchain. The data may be analyzed in comparison to past data in the memory of the analysis system and a measure of the risk of the data may be determined in comparison to past data in the memory of the analysis system. The measure of risk may be communicated to the blockchain storage system; and may be added to the data in a memory in the analysis system.

Other data may include:
Count contracts
Types of Contracts
First seen
Reputation Score
Connective
Ego Net size
Influence score
Previous Activity Finally, the block 1 901 may also contain transaction data 940. Block 2 902 and block 3 903 may contain similar types of data with the information being specific to the transaction represented by each block 902, 903. In response to the risk score being over a threshold, members of blockchain may be alerted of the risk score. In addition, the risk score may be communicated to parties looking to join the blockchain. In some embodiments, if the risk score is over a threshold, the contract may be terminated from executing on the blockchain storage system.

Protocols also may be used to communicate with the blockchain. By using protocols, the blockchain may know what information will be in what position in the communications from users, investors and other participants in the blockchain. The protocols may be created according to a standard or may be proprietary for each blockchain.

A user interface may be used to create the initial blockchain for the project at hand. A user interface may be available for the relevant parties such as investors and startups to register. The blockchain may also contain stage funding requirements and may accept stage submissions for achieving goals. Investors and the public may also have a user friendly UI for voting stage achievements for next stage investment. The blockchain 105 may also provide possible data analysis on future returns or current investment, etc.

Possible use cases include situations where each participant has their own blockchain with a contract and customized model, based on the type of the participant and the contract. In case of any update in the participant's status, the new score will be delivered and saved in the participant's blockchain.

In another situation, the loan issuer estimates the riskiness of giving the loan to an endeavor (startup, union, person, . . . ). The current risk score of the endeavor, which is available in their blockchain, may allow users to estimate the risks. The history of changing of the risk score may show the trend. The decisions about accepting new partner or joining to the endeavor can be made based on the expected risk score change after that occurrence.

Investment and crowd sourcing loans could use the platform where investors 'loan' the money to the startups, and startups pay off these loans back with an interest defined in the contract. Investor may load the money to the 'investment pull', regulated by authority. Startups may be withdrawing the money from that 'pull' and pay off this loan along with the interest. This return may be forwarded to the contributors after deducting the service fee. All startups may have risk scores. There is a threshold, defined by a risk score, when the startups are allowed to participate in withdrawing money from the 'pull'.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A blockchain storage system comprising:
a node on the blockchain storage system comprising computer executable code for:
  receiving first transaction data for execution on the blockchain storage system;
  iteratively reviewing the first transaction data in comparison to second transaction data for a plurality of past transactions in a memory of the blockchain storage system;
  determining a particular risk score based on the iterative review;
  in response to the particular risk score being over a threshold, canceling execution of the first transaction data; and
  in response to the particular risk score being over the threshold, alerting members of the blockchain storage system of the particular risk score.

2. The blockchain storage system of claim 1, further comprising a further node on the blockchain storage system node comprising data from other blocks on the blockchain used for blockchain verification.

3. The blockchain storage system of claim 1, wherein the first transaction data includes a contract based transaction executable on the blockchain storage system.

4. The blockchain storage system of claim 3, wherein canceling execution of the first transaction data includes canceling the contract based transaction executing on the blockchain storage system.

5. The blockchain storage system of claim 1, wherein the second transaction data includes a plurality of training groups of past data in the memory of the blockchain storage system.

6. The blockchain storage system of claim 5, wherein determining the particular risk score based on the iterative review includes computer executable code for refining a previous risk score based on an iterative review of the first transaction data in comparison to the plurality of training groups of past data in the memory of the blockchain storage system to determine the particular risk score.

7. A method of analyzing a blockchain storage system based transaction comprising:
  creating a blockchain model to represent first transaction data;
  iteratively reviewing the first transaction data in comparison to second transaction data for a plurality of past transactions in a memory of the blockchain storage system;
  determining a particular risk score based on the iterative review;
  in response to the particular risk score being over a threshold, canceling execution of the first transaction data; and
  in response to the particular risk score being over the threshold, alerting members of the blockchain storage system of the particular risk score.

8. The method of claim 7, further comprising a node on the blockchain storage system comprising data from other blocks on the blockchain used for blockchain verification.

9. The method of claim 7, wherein the first transaction data includes a contract based transaction executable on the blockchain storage system.

10. The method of claim 9, wherein canceling execution of the first transaction data includes canceling the contract based transaction executing on the blockchain storage system.

11. The method of claim 7, wherein:
  the second transaction data includes a plurality of training groups of past data in the memory of the blockchain storage system; and
  wherein determining the particular risk score based on the iterative review includes refining a previous risk score based on an iterative review of the first transaction data in comparison to the plurality of training groups of past data in the memory of the blockchain storage system to determine the particular risk score.

12. A non-transitory computer-readable medium including computer-executable instructions for analyzing a blockchain storage system based transaction, comprising instructions for:
  creating a blockchain model to represent first transaction data;
  iteratively reviewing the first transaction data in comparison to second transaction data for a plurality of past transactions in a memory of the blockchain storage system;
  determining a particular risk score based on the iterative review;
  in response to the particular risk score being over a threshold, canceling execution of the first transaction data; and
  in response to the particular risk score being over the threshold, alerting members of the blockchain storage system of the particular risk score.

13. The non-transitory computer-readable medium of claim 12, further comprising verifying the blockchain model based on data from other blocks on the blockchain storage system.

14. The non-transitory computer-readable medium of claim 12, wherein the first transaction data includes a contract based transaction executable on the blockchain storage system.

15. The method of claim 14, wherein canceling execution of the first transaction data includes canceling the contract based transaction executing on the blockchain storage system.

16. The non-transitory computer-readable medium of claim 12, wherein the second transaction data includes a plurality of training groups of past data in a memory of the blockchain storage system.

17. The non-transitory computer-readable medium of claim 16, wherein the instructions for determining the particular risk score based on the iterative review includes instructions for refining a previous risk score based on an iterative review of the first transaction data in comparison to the plurality of training groups of past data in the memory of the blockchain storage system to determine the particular risk score.

* * * * *